Figure 1:
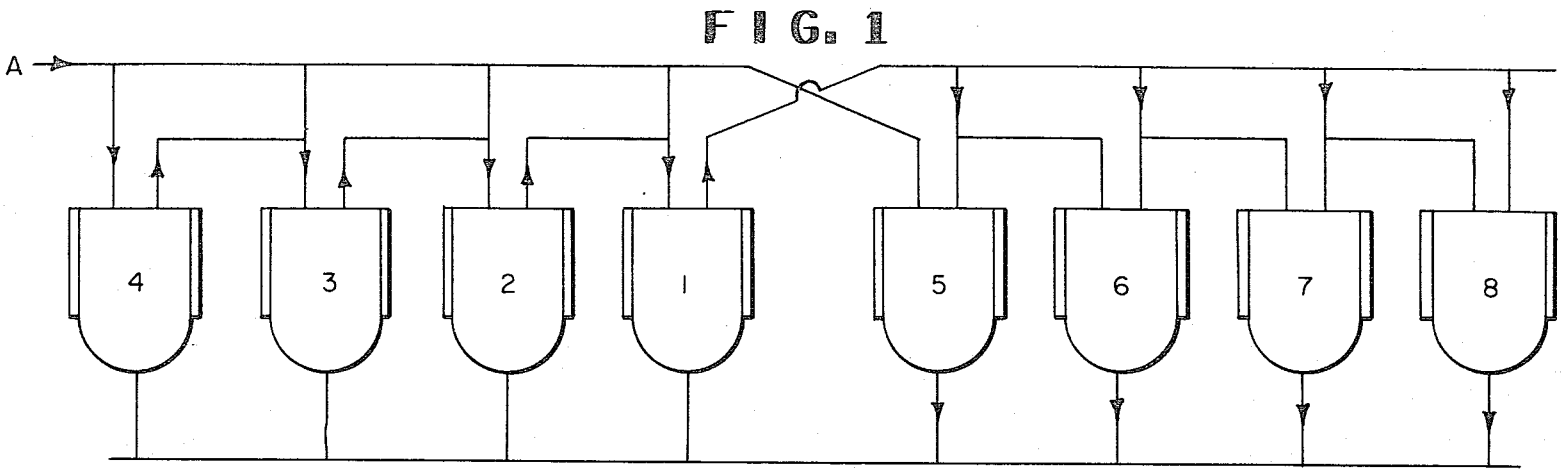
Figure 2:
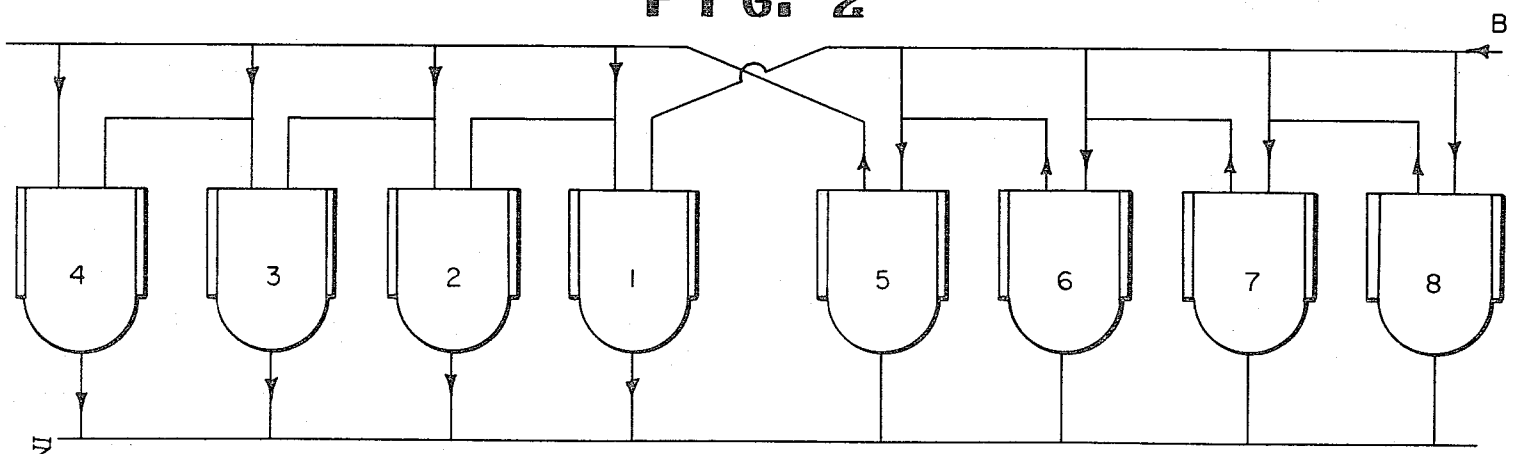

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 25, 1972

900 O.G. 1232

T900,023

CHLOROPRENE POLYMERIZATION PROCESS

Edwin Benjamins, Montague, Mich., assignor to E. I. du Pont de Nemours and Company, Wilmington, Del.

Filed May 25, 1971, Ser. No. 146,728
**Int. Cl. C08d *1/09, 3/14***
U.S. Cl. 260—92.3
1 Sheet Drawing. 14 Pages Specification

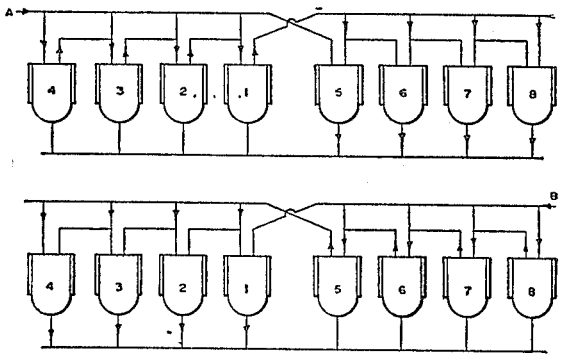

Chloroprene is polymerized in aqueous emulsion by an improved process involving (1) initiating and conducting part of the polymerization in one reaction zone in which the polymerization is carried out in a continuous manner and (2) completing the polymerization in a second reaction zone in which the polymerization is carried out in a batchwise manner. The continuous zone consists of at least two agitated, confined, interconnected reaction vessels and the batch zone consists of at least an equal number of similarly defined vessels having volumes approximately equal to those of the continuous zone. Advantages of the improved process relative to a completely continuous process are increased productive capacity, better control of the polymer viscosity, and greater access to the polymerization equipment for purposes of cleaning. Relative to a completely batch process the improved process has the advantage of permitting more accurate control of conversion of monomer to polymer.

July 25, 1972

E. BENJAMINS

T900,023

CHLOROPRENE POLYMERIZATION PROCESS

Filed May 25, 1971

INVENTOR

EDWIN BENJAMINS

BY Fred C. Carlson

ATTORNEY